(12) United States Patent
Shuma et al.

(10) Patent No.: US 8,830,238 B1
(45) Date of Patent: Sep. 9, 2014

(54) DISPLAY OF SHADED OBJECTS ON COMPUTING DEVICE

(75) Inventors: James J. Shuma, Saratoga, CA (US); Gilles Debunne, San Francisco, CA (US)

(73) Assignee: Google Inc., Mountain View, CA (US)

( * ) Notice: Subject to any disclaimer, the term of this patent is extended or adjusted under 35 U.S.C. 154(b) by 323 days.

(21) Appl. No.: 13/344,612

(22) Filed: Jan. 5, 2012

Related U.S. Application Data

(60) Provisional application No. 61/430,165, filed on Jan. 5, 2011, provisional application No. 61/430,532, filed on Jan. 6, 2011.

(51) Int. Cl.
*G06T 15/50* (2011.01)

(52) U.S. Cl.
USPC ............ 345/426; 345/581; 345/619; 382/266

(58) Field of Classification Search
CPC ... G06F 3/0483; G06F 9/4443; H04N 1/4092; G06T 15/506; G06T 15/60; G06T 15/80; G06T 15/83; G06T 15/87
See application file for complete search history.

(56) References Cited

U.S. PATENT DOCUMENTS

| | | | |
|---|---|---|---|
| 6,175,367 B1* | 1/2001 | Parikh et al. | 345/426 |
| 2010/0175018 A1 | 7/2010 | Petschnigg et al. | |
| 2011/0181616 A1* | 7/2011 | Sayers et al. | 345/619 |
| 2012/0005585 A1* | 1/2012 | Yum | 715/738 |
| 2013/0290595 A1 | 10/2013 | Weissman et al. | |

FOREIGN PATENT DOCUMENTS

| | | |
|---|---|---|
| EP | 2444887 | 4/2012 |
| WO | 2010/080258 | 7/2010 |

* cited by examiner

*Primary Examiner* — Antonio A Caschera
(74) *Attorney, Agent, or Firm* — Fish & Richardson P.C.

(57) ABSTRACT

A computer-implemented method for displaying shadowing effects includes displaying, on a computing device, a visual object that has a first edge and a second edge that is different from the first edge; generating a shadow for the visual object using a first shadowing technique along the first edge; generating, along the second edge, shading for the visual object using a technique that differs from the first shadowing technique; and updating the shadow and the shading substantially simultaneously with movement of the visual object by a user of the computing device.

20 Claims, 9 Drawing Sheets

DISPLAY OF SHADED OBJECTS ON COMPUTING DEVICE

CROSS-REFERENCE TO RELATED APPLICATION

This application claims priority under 35 U.S.C. §119(e) to U.S. Provisional Patent Application Ser. No. 61/430,165, filed on Jan. 5, 2011, and to U.S. Provisional Patent Application Ser. No. 61/430,532, filed on Jan. 6, 2011, the entire contents of each of which are incorporated by reference as if set forth fully herein.

TECHNICAL FIELD

This document relates to mechanisms for computer displays, including displays of pages in electronic books.

BACKGROUND

Computing devices provide us ever greater features and types of applications. While early applications were very numbers-based and centered around paper cards or punch tapes, eventually they added video display monitors and text input (via keyboard) and output became a central tenet of computer operation. Eventually, graphical user interfaces were developed that added color and other visual richness to computer applications, and even allowed the development of applications that could visually replicate certain real world systems.

Computer applications also continue to advance in complexity, and in the types user interfaces that are generated to improve the experience that a user has in interacting with the applications. For example, electronic book reader applications can display text at different sizes that correspond to a reader's particular needs. In addition, some applications provide a page turning experience that looks like an actual paper page being bent and turned, and then laid flat again.

SUMMARY

This document discusses systems and techniques for displaying graphical representations of items such as books and other documents. The techniques described here are directed to providing a visual impression, on the screen of a computing device, that a user is interacting with an actual book. And in certain implementations, the content of the book may have been scanned from a physical book, so that adding "chrome" in the form of rendered covers and bindings for a book makes the experience all-the-more real.

Thus, for example, when a user turns a page of a book (or magazine or other similar document), techniques described below make provide a representation that appears as if the page has been grabbed by the user (e.g., at a location over the page on a touchscreen display where the user made contact and started to drag in the direction of pulling the page to turn it). At the same time, the system may generate a shadow on the top of the neighboring page around the free end of the moving page, to create an effect as if the moving page is casting a shadow. A shading may be applied and moved along the attached edge of the page at the simulated binding, where the shading move inward or outward on the page to indicate that the page at that location is starting to tip toward the other side of the book. Simultaneously, a shading that was near the binding before the page turning action began may be removed gradually in favor of the page-turning shading. Once the page has "flipped" so that the previously-back side of the page is visible, the shading and shadow may be reversed, so that a shadow is cast on the other side of the moving page, and shading is applied at the other side also. When the page is fully turned, and is dropped into position on the other side of the representation of the book, the shadow may be removed fully, and the "at rest" shading near the binding may be return—though on the other side of the page at which it started (and similar shading at the binding may be provided on the newly-exposed page). Such actions may occur in an opposite direction for turning backward in a book as opposed to forward in it, and the operations may be repeated for each page turn.

Additional features are discussed below to address situation in which a user is zoomed in on an imaged page (e.g., a page whose content portion was captured by scanning a real book) and the user express an intent to turn to the next or previous page. In such a situation, the system may zoom out momentarily so that the user is shown all or substantially all of the open book or of the current page, may turn the page (if turning of the rendered page is needed, e.g., if the user is on the right-hand page of an opened book and seeks to move forward in the book), and then may automatically zoom in on the new page at the same zoom level it was at before the page turn operation. Such operations may maintain a zoom level at which the reader was comfortable but may move the reader forward (or backward) in the book with a view of the context in which the change was made. As such, the techniques may provide an intuitive and visually pleasing user experience in moving about in a representation of an imaged book.

The techniques of the prior paragraphs may also be combined. For example, if a user is zoomed in on a page and shows an intent to turn to another page, the display may zoom out to show the laid-open book, the page may be turned with the shading and shadowing techniques above, and the view may be zoomed back in to the original zoom level automatically in the manners discussed above. Also, if a user begins motions to turn a page but does not complete them (e.g., begins swiping laterally on a touchscreen but does not go far enough to complete a page turn, and instead swipes back toward the original positions), the system may go back to where it started—i.e., it may allow the page to fall back to its original position with shading and shadows following it, and the zoom level and position may return to the level and position from before the user began indicating an intent to turn the page.

The techniques discussed here may, in certain implementations, provide one or more advantages. For example, a user of a portable electronic device may be shown scanned, imaged pages with "chrome" around the pages so that they appear to be in the context of a real book. That context may be maintained and enhanced when the user turns a page by providing a realistic rendering of the turning page, with shading and shadows. Moreover, because the page is an imaged page rather than a page that is constructed from bare text, zooming on the page maintains the original layout and context of the page, but prevents a user from seeing other portions of the page, so that the zooming techniques described here may help the user maintain their zoom level while also maintaining their context within a book.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
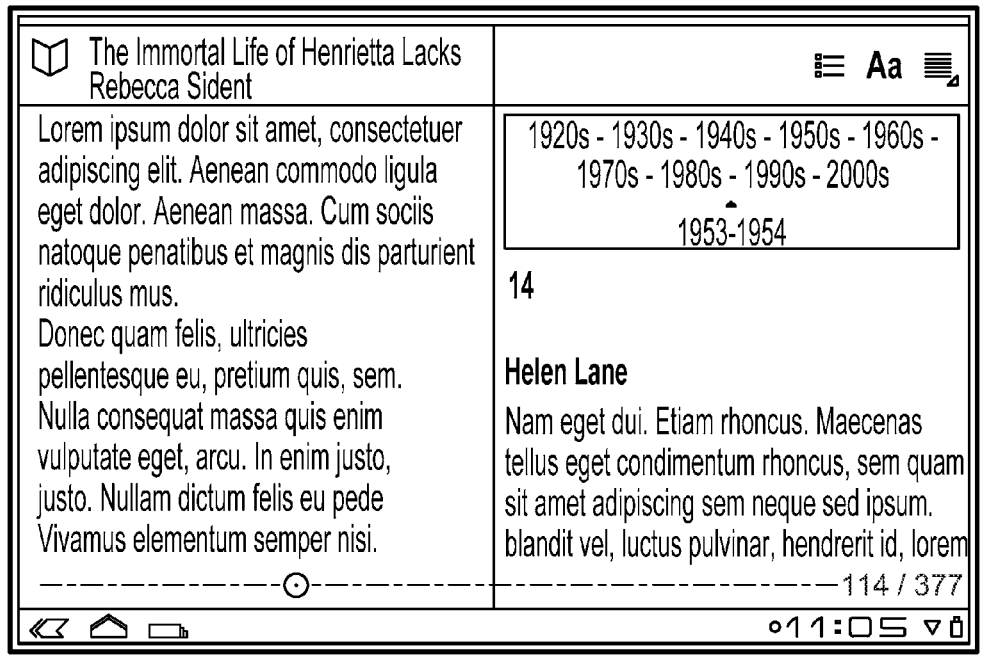
FIGS. 1A and 1B are screen shots of a computing device displaying a book reader application.
Figure 1B:
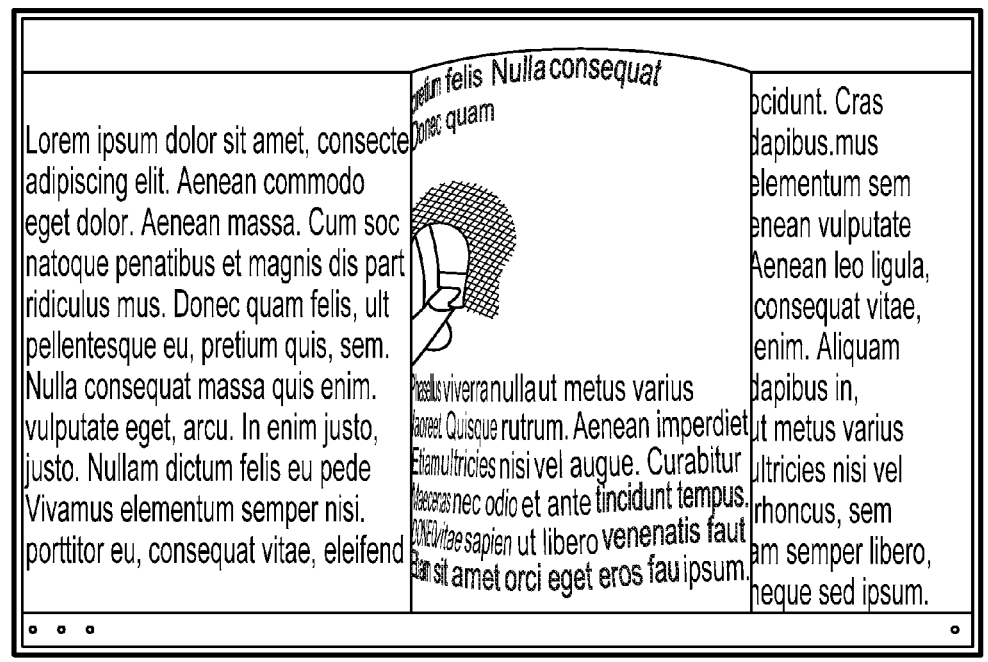

FIGS. 1A and 1B are screen shots of a computing device displaying a book reader application. In FIG. 1A, the document is shown as laying essentially flat, with a page counter along the bottom of the reader application, and a progress bar having a dot indicating that the user is about one-quarter of the way through the document. The user may press on the dot and drag it right or left to jump quickly forward and back, respectively, through the document.

A horizontal lines is also shown at the bottom of the screen, along which the dot slides, and gaps are shown in the line to indicate where in the document there are chapter breaks and the like. As a result, if a use wants to jump forward two chapters quickly, she may press on the dot and drag it to the right across two gaps that are shown in the line.

Although the document is shown as lying flat, there is a small divider between the left page and the right page in FIG. 1A. the divider may simply be a thick vertical line of a particular color, or may be shaded darker toward the middle of the book to provide a visual impression of the paper pinching downward away from the viewer and into a binding.

In the image of FIG. 1B, a page is shown being turned, with shading provided along the bound end of the page and on the next page, which is visually below the page being turned so as to provide the visual effect of an actual book page being turned and casting a shadow on the lower page (and immediately adjacent the loose edge of the turning page). Specifically, shading and shadowing occurs near two edges of the page: (1) shadowing off the right end of the page to show depth between the end of the page and the next page shown below it; and (2) shading along a curve on the left side of the page to show that the paper is being bent as the page is turned. (However, at times here, shading may be used to encompass both operations.) Shading and shadowing may also occur between two adjacent pages as a vertical shadow that represents where the two adjacent pages meet in the book binding of an actual book. The opacity of such shading or shadowing may be affected when a page is being turned.

The shading may be reversed if a page is being turned in the opposite direction or after the page reaches the halfway point in a turn. In particular, when the loose edge of the page is to the left of the center of the book, a shadow may be cast onto the page that is shown in FIG. 1B as being shadow and shade-free (except perhaps very close to the binding), and shading may be applied to the opposite side of the page that is being turned, though still at the attached edge of the page. Although the page turning here is "straight," in that the loose edge of the page is vertical, the page turning may also be at an angle so that the edge is at a diagonal. In such a situation, the shadow may still be thrown on the page below, but it may be at an angle.

In this example, the types of shading for each side of the page are different. The right edge uses texturing, such as by a statically-defined texture at a position indicated by a current position of the page as it is being turned (where each form of shading is updated as the page is moved back and forth by a user).

The left edge uses standard lighting techniques such as Phong or Blinn shading, and by computing light from a synthetic light source falling on particular pixels of the page, including by using dot products between angles of incident light and angles from which the user is perceived to be viewing the page.

The impression of the page being turned is further emphasized by rendering the page using perspective projection. In particular, portions of the page that are determined, in the rendering process, to be further from the viewer are also rendered as smaller, or closer together. As a result, the free end of the turning page is smaller than its middle portion, and the text on the page is also pinched more together at the free end than in the middle. Again, the free end is vertically oriented, though it could also be angled slightly as the page is turned, and the shading and shadows may be provided along with such motion.

Figure 2A:
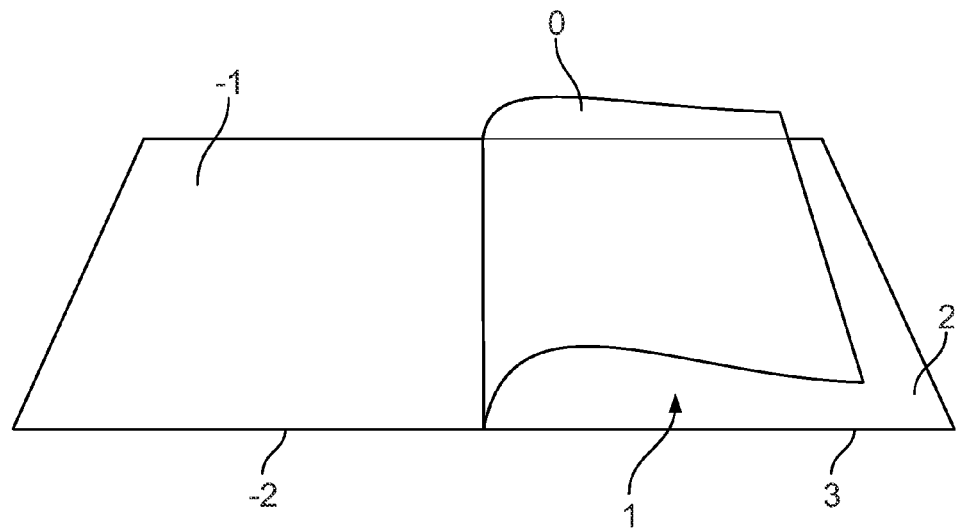
FIG. 2A is a schematic diagram of the components of a virtual book to be displayed in a reader application.

FIG. 2A is a schematic diagram of the components of a virtual book to be displayed in a reader application. This figure demonstrates a concept known as a "page wheel," which is like a buffer of n virtual two-sided pieces of paper that are rendered on each side of the currently-displayed page sides. Each page surface on the wheel may be termed a "slot" on the wheel, such that there are 2n slots. The cached slots may be distributed equally in front of and behind the current position of the reader. Alternatively, the slots may be biased toward a side that is in the same direction as the last page turn by the user. For example, if a user turns a page forward, the system may pre-render pages so that there are 6 slots ready in front of the user and 4 slots behind.

Referring now more specifically to the elements of FIG. 2A, consider a system having six slots and a user who is looking at page 6 of a book in landscape (so that a pair of pages is open to the user) and is turning the page forward. Each of the pages is indicated by a relative number, with page 6 being 0, page 7 being 1, page 5 being −1, and page 4 being −2 (and facing downward and away from the viewer in FIG. 2A). By default, the turned page would be at slot 0, and would be displayed on the right side of the book in landscape. Page 5 would be in slot −1, and would appear on the left. Page 7, which is under page 6 on the opposite side of the page and not visible, would be in slot 1 because it had already been rendered. Page 8 is also not visible because page 6 is blocking it, and would be in slot 2 because it has already been rendered. Slots 3 and 4 would be marked as empty and contain no data. The index for tracking the main page would be set at 0 but would be incremented by two once a page change was completed. A module for caching pages would also then request the pre-rendering of pages 9 and 10 of the book.

Figure 2B:
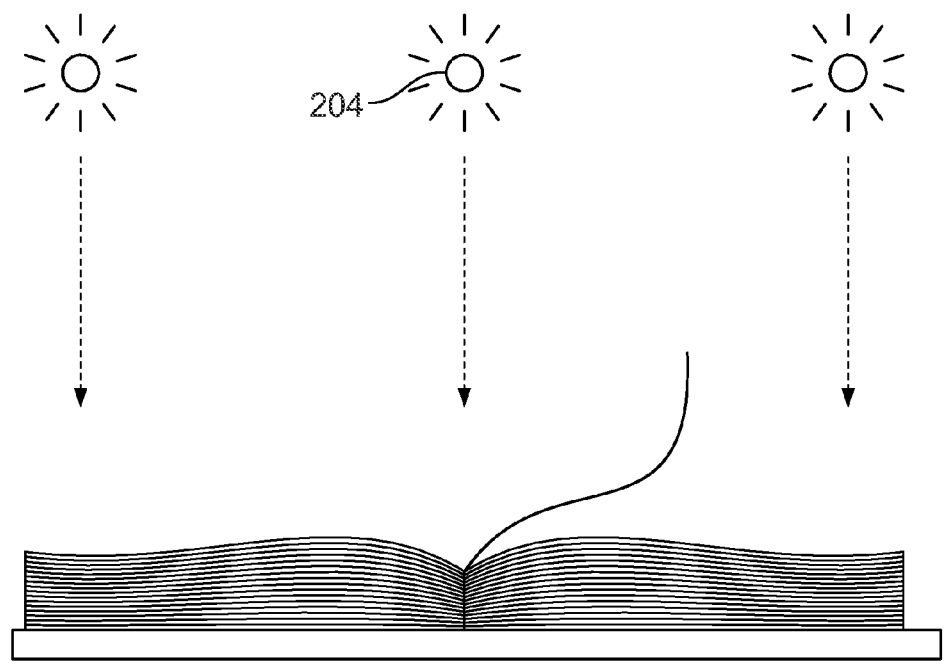
FIG. 2B shows components of a book having a page turned, and lighting for the book.

FIG. 2B shows components of a book having a page turned, and lighting for the book. The figure shows a representation of a book with one page in the process of being flipped upward to be turned. Light sources 204 are shown above the book to indicate that, for lighting techniques performed on a rendering of the book, all downward vertical parallel rays are used. As shown in the figure, for each page pixel that drawn in a rendering, the page texture is sampled for determining what texel to display at that pixel (as is the case for any time a texture is drawn on a polygon); and then the resulting value is scaled by a lighting value. The lighting value is a scalar value calculated as the dot product of the straight-up vector, which is equal to H, V, and L in a Blinn lighting model (which in this example is a line between the book and the light source (204)) with the page's normal vector. The texel-scaled-by-lighting value is then what is drawn for the pixel in question. Such a computation is performed for every pixel on the screen.

Figure 3A:
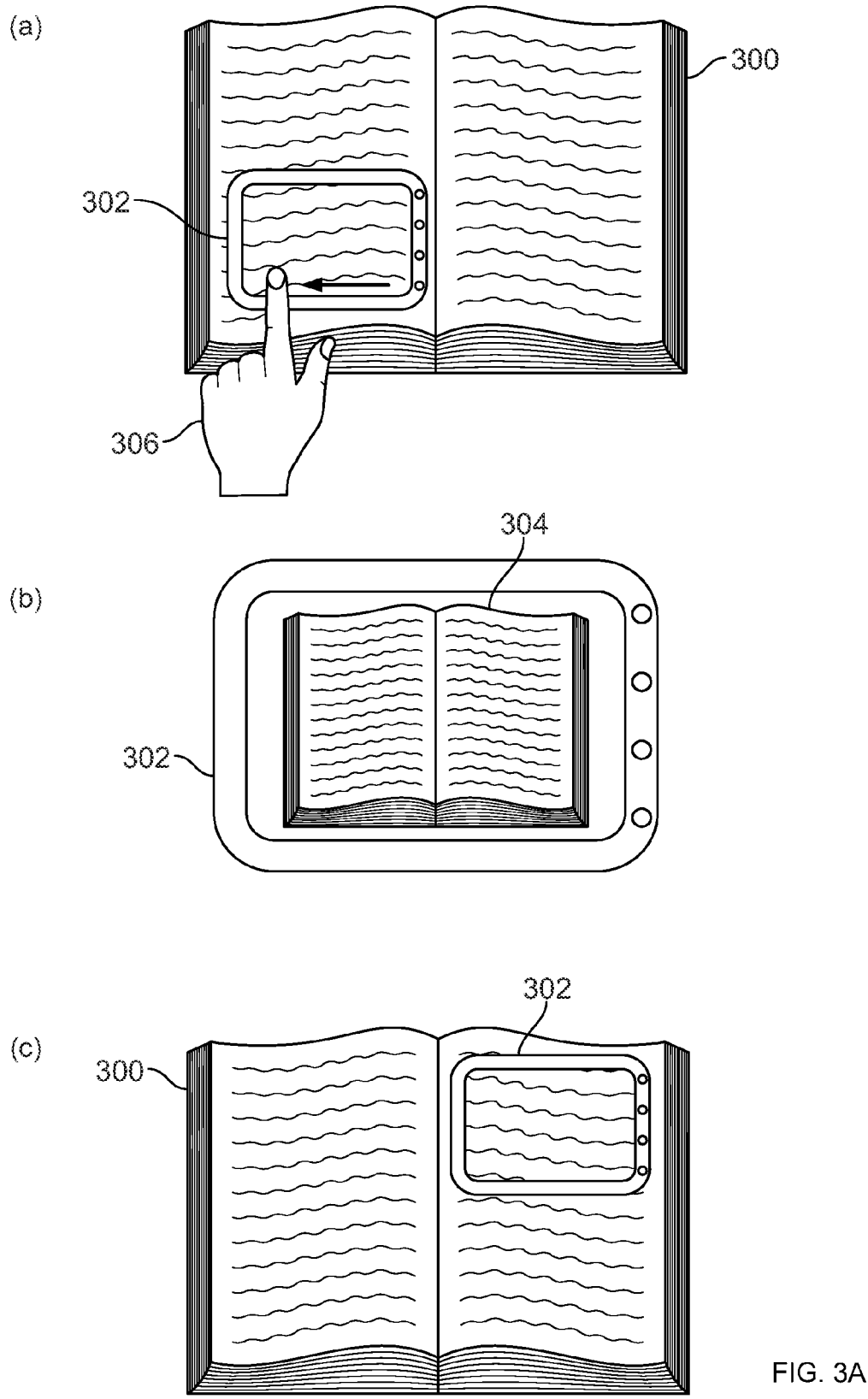
FIGS. 3A and 3B shown conceptual images that represent zooming as part of a page turning operation on a book.
Figure 3B:
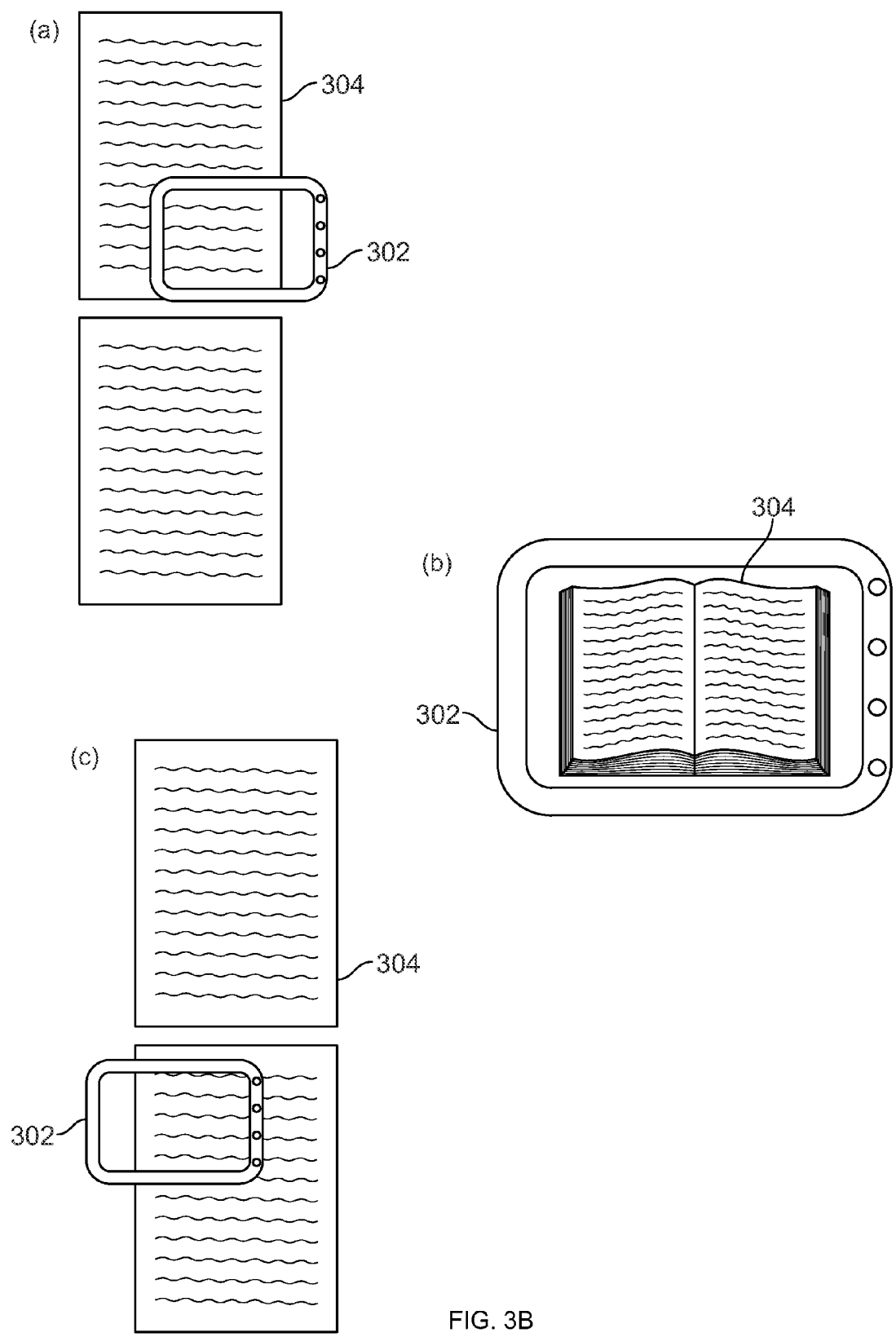

Referring to FIGS. 3A and 3B, various conceptual diagrams illustrate zooming while page turning in a document. In FIG. 3A(a), a conceptual representation of an imaged document 300 is shown. A portable computing device 302 is shown over the imaged document 300. The position of the computing device 302 represents the portion of the imaged document 300 on which the computing device 302 is zoomed in. For example, in FIG. 3A(a), the computing device 302 is displaying the imaged document 300 and has zoomed in on the bottom half of the left page. A user 306 is show left-swiping on the display of the computing device 302, as indicated by a left-pointing arrow.

In FIG. 3A(b), the computing device 302 is shown displaying a zoomed-out version 304 of the imaged document 300. In this mode of display, both pages of the imaged document 300 are shown. For example, if the imaged document 300 is taken from a hardcover book (or softcover), as shown in FIG. 3A, the zoomed-out version 304 of the imaged document 300 shows both pages of a book lying open on a table, while a zoomed-in version provides only a partial display of one or both pages, as illustrated by FIG. 3A(a). FIG. 3A(b) also displays additional features representative of a physical document, as if it were lying on a table. For example, in the example where the imaged document 300 is a hardcover book, FIG. 3A(b) shows a representation of pages of the book along the edges of the book 308, thereby presenting a physical representation of a reading a book. These additional features may be referred to as the chrome 308. This physical display therefore provides a more "real" feel to reading a book or other document on a computing device 302.

FIG. 3A(c) shows another conceptual representation of the imaged document 300 on the computing device 302. In this representation, the computing device 302 is zoomed in on the top of the right page of the zoomed-out version 304 of the imaged document 300.

In some embodiments, a left-swipe by a user 306 on the display of the computing device 302 as shown in FIG. 3A(a) causes the computing device 302 to go to the next page or to effectively "turn the page" of the document. For example, if the computing device 302 is zoomed in on the bottom of the left page of the imaged document 300, as in FIG. 3A(a), a left swipe may cause the computing device 302 to display the portion of the imaged document 300 shown on the computing device 302 in FIG. 3A(c)—that is, the portion of the document on the next page at the top of the page. In such an embodiment, the left swipe causes the computing device 302 to go from a zoomed-in display of a representation of the bottom of a first page to a zoomed-in display of the top of a representation of the top of the next page in an imaged document 300. In some embodiments, the left swipe further causes an animation to occur while transitioning the display of the imaged document 300. For instance, where the imaged document 300 is zoomed in, the left swipe by a user 306 may first cause the computing device 302 to zoom out from the display shown in FIG. 3A(a) and then zoom back in to the display shown in FIG. 3A(c).

In other embodiments, a left swipe by a user 306 on the display of a computing device does not result in a zoomed-in display of an imaged document 300. For example, a left swipe as shown in FIG. 3A(a) may cause the computing device 302 to effectively "turn the page" of the imaged document 300. That is, if the computing device 302 were previously displaying pages 8 and 9 of an imaged document 300 (as in FIG. 3A(b), for example) and had zoomed in on page 8 (as in FIG. 3A(a), for example), a left swipe may cause the computing device 302 to "turn the page" to display pages 10 and 11. As a result of a left swipe by a user 306, the computing device 302 may display both pages 10 and 11 (as in FIG. 3A(b), for example), or a zoomed-in display of page 10 (as in FIG. 3A(a), for example). In some embodiments, a zoomed-in display of the next page may be zoomed in on the top of the next page.

In an example where a "page turn" is animated (as would be the case in going from a display of pages 8 and 9 to pages 10 and 11 of a physical book), a computing device 302 displaying a zoomed-in portion of an imaged document 300 (as in FIG. 3A(a)) may first provide an animation of the imaged document 300 zooming out. Then the computing device 302 may provide an animation of the imaged document 300 turning a page—showing an animation of a physical page being turned. In this embodiment, the chrome 308 would animate to display a page of a book appearing to turn. After displaying an animation of the physical page being turned, the computing device 302 may then display the next page or pages (e.g., both pages 10 and 11) of the imaged document 300. In some embodiments, the computing device 302 further shows an animation zooming into the next page of the imaged document 300.

Referring to FIG. 3B, another conceptual diagram of zooming while page turning in a document is shown. In this example, the imaged document 300 is displayed as continuous pages, as represented in FIGS. 3B(a) and (c). In FIG. 3B(a), the portable computing device 302 is shown as zoomed in on the bottom right corner of page 1 of the imaged document 300. FIG. 3B(b) illustrates the computing device 302 displaying a zoomed-out version 304 of the imaged document 300 in a hardcover book mode of display where the chrome 308 is shown around the edges of the imaged document 300.

Figure 4:
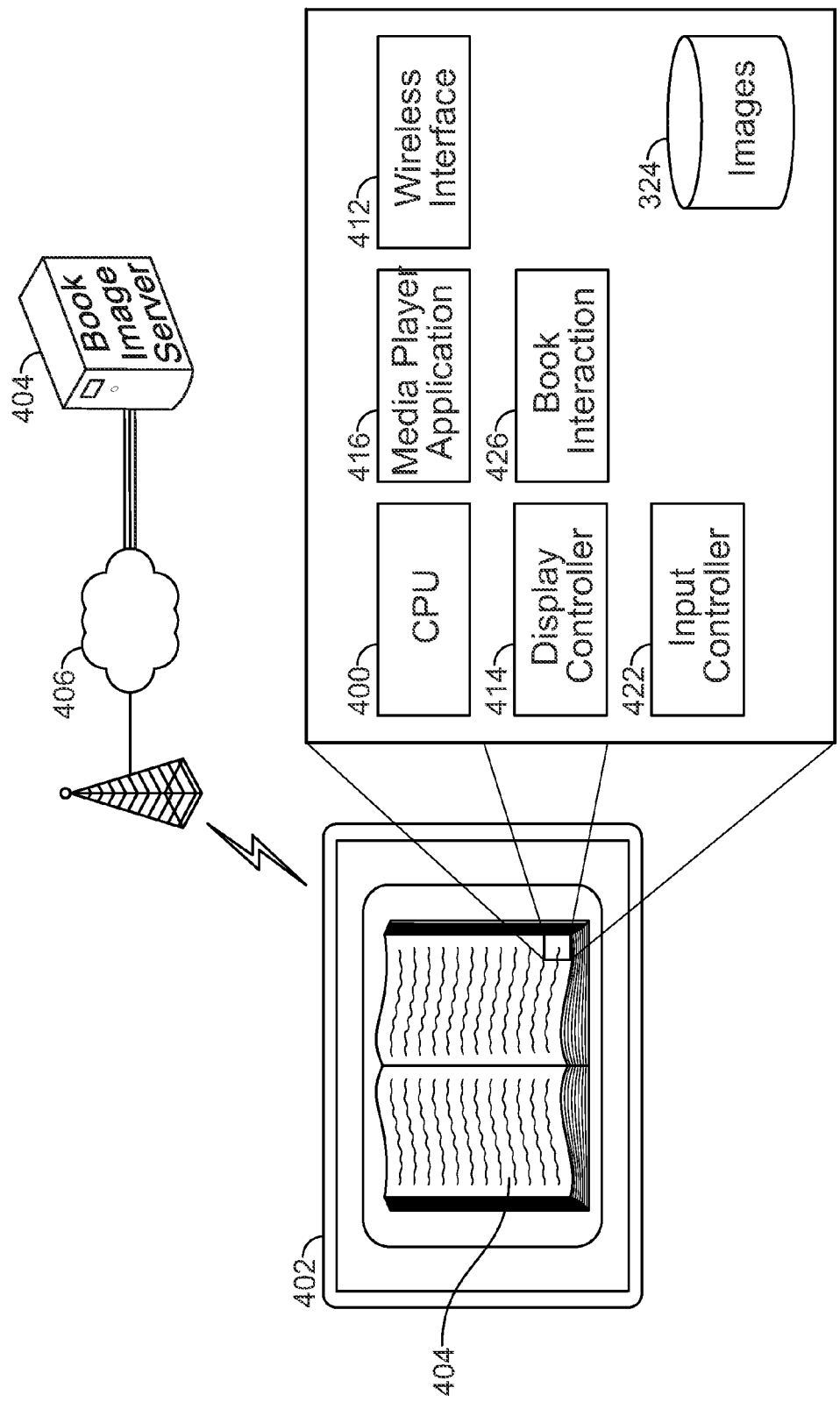
FIG. 4 is a schematic diagram of a system for generating images of books as part of a reader application.

FIG. 4 is a schematic diagram of a system for generating images of books as part of a reader application. In general, the system shown in FIG. 4 allows a computer device, such as a portable device 402, having a CPU 400, to present information via a graphical user interface, where the objects may include books and other documents, and page turning for such documents may be animated and rendered in a realistic manner according to the techniques described above.

Referring now more specifically to components of the system shown in FIG. 4, the device 402 is arranged to communicate through a wireless network and then the network 406, such as the Internet, with various hosted services. In this example, the hosted service that is being used is an image service provided by book image server 404. Interaction between computing devices and an image server system is well-known and may include the receipt of image files by the device 402, where the file may include a header that identifies meta data and a body of the file defines data for generating the image on a display. In some examples, the images may be of scanned digital images of pages of actual physical books and may be accessed for display on the device 402.

The device 402 has been loaded with a media player application 416 for playing media files such as books on the device 402, and also for displaying pages of the books on a display 404 of the device. Other applications on the device may require rendering services for other purposes, and the media player application 416 is discussed here for purposes of illustration only. The display 404 on the device 402 shows a book opened flat, similar to the displays in FIGS. 1A and 1B.

Particular components shown in schematic form as executing on the device 402 may affect the manner in which the application 416 is displayed on the device 402. For example, a display controller 414 may control the manner in which different applications access the display of device 402, and the manner in which their content is displayed on that display. For example, the display controller 414 may identify which application is currently the focus of the device 402 and may display content from that application in preference to content from other applications. The display controller 414 may also identify which user interface elements, such as elements generated by particular activities of an application, are to be displayed at a current time on the display of device 402.

An input controller 422 may interact with the display controller 414 and may identify various inputs received on the device 402. Such input, for example, may include touch-based inputs on a touch sensitive portion of the display on device 402. The location of a particular touch input as sent by the input controller 402 may be coordinated with locations of items in the user interface displayed by the display controller 414, so that a user intention for a touch input may be discerned. For example, a user dragging on the pages of a book make cause those pages to be smoothly turned in an animated sequence in coordination with a user input.

An book interaction module 426 is also provided on the device 402 and may interact with the display controller 414 and a GPU 420 to render pages as they are turned, both with shading and shadows, and for zooming into close views of the book, thus implementing techniques like those described above with FIGS. 3A and 3B A wireless interface 412 may be used to receive image data and send such data back and forth to the image server 404 through the network 406. The media player application 416 may be programmed according to an application programming interface to access information that is passing through the wireless interface 412. For example, the media player application 416 may register with an operating system that is executing on the device 402 to be notified when images are received from the image server 406 and to be provided with data from such messages so that they can be displayed on the device 402 in a quickly-updated manner (e.g., if the user is accessing a book from the cloud). An images database 324 may also be the source of images to be displayed on the device 402. The database 324 may store images persistently or may cache images obtained from image server 406.

Figure 5A:
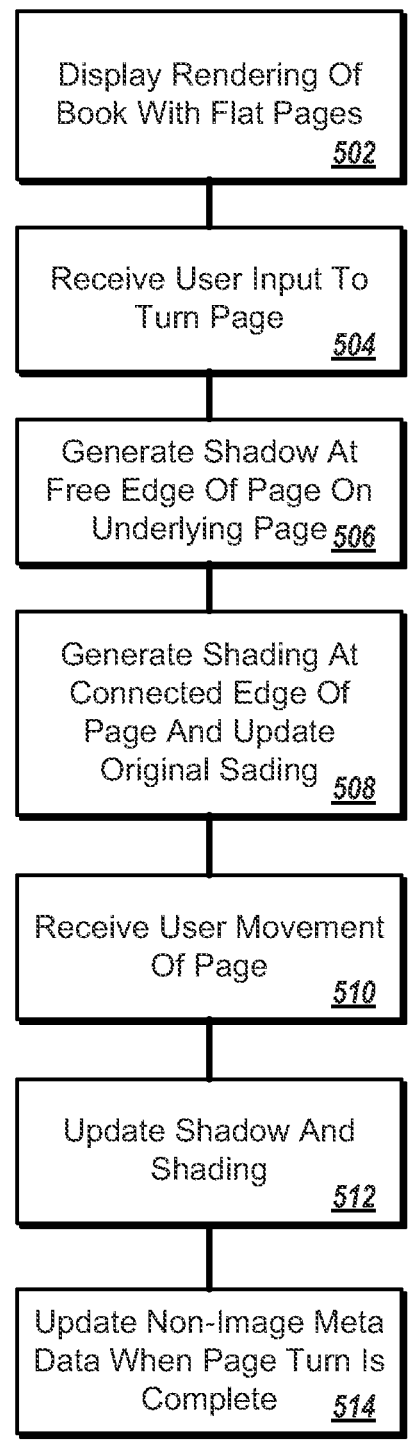
FIG. 5A is a flow chart of a process for shading and shadowing a turning virtual book page.

FIG. 5A is a flow chart of a process for shading and shadowing a turning virtual book page. In general, the process involves identifying a representation of a page that is in the process of being turned, and thus needs to be rendered as if it is lifting away from the other pages in the book at one end.

The process begins at 502, where a rendering of a book is displayed with flat pages. Flat pages means that none of the pages is being turned, but there may still be shading on the pages to simulate the look of an open book that bulges upward somewhat on each side of the binding in the middle of the open book.

At 504, the process receives user input to turn a page. Such input may involve pressing a user-selectable control or swiping across a touchscreen display in a direction of turning. The remaining steps may begin occurring while such input is being received and before a user's input indicates an intent to complete a page turn. Also, the remaining steps may occur in coordination with zooming out and back in when the user was zoomed in on a portion of an imaged page before starting the input (see, e.g., FIG. 5B).

At 506, the process generates a shadow at the free edge of the page onto the representation of the underlying page, and at 508 the process simultaneously generates shading at a connected edge of the page. The process may also update any shading that was originally shown where the page entered the binding. Such updating may be gradual, in that the original shading may be removed in amounts that are a function of the degree to which the page turning is complete (i.e., the angle of the page through its path of turning). Also, such shading can be updated as a user moves the page backward and forward (510 and 512).

Finally, at a point, the process determines that the user wants to complete the change to a new page or abort the action and return to the original page. In such a situation, the turning page may be animated to its final position (with updating of the shading and shadows) as it moves. When the page is settled, various meta-data may be updated around the page, such as a numeric indicator that shows what page of the book the user is on.

Figure 5B:
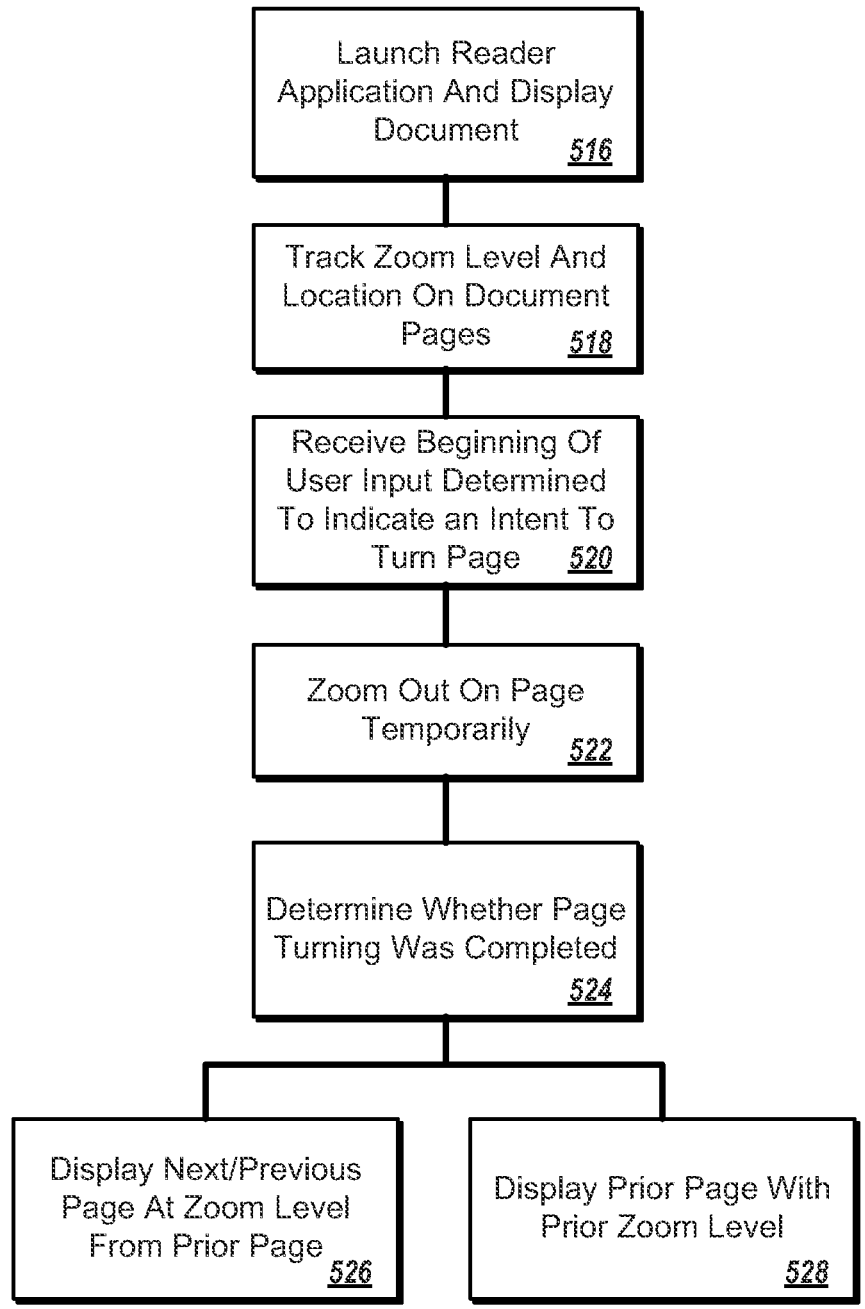
FIG. 5B is a flow chart of a process for performing zooming as part of a page turn for a virtual book

Referring to FIG. 5B, a flow chart of an exemplary method for zooming while turning a page on a computing device is shown. At 516 in the method, a computing device launches a reader application and displays an imaged document. In some embodiments, the displayed imaged document may be a scanned representation of a book or magazine. In such an embodiment, the displayed document appears as the physical book or magazine represented would appear in person. Features such as page numbers and, in some instances, creases on the edges of pages or writing on the margins of a page, may appear in the imaged document. Other such features that may appear as the result of physical scanning are possible.

If a user 306 viewing the imaged document 300 of FIG. 3B(a) down swipes, the computing device 302 responds by displaying the next page. In some embodiments, the down swipe causes the computing device 302 to advance and show a zoomed-in version of the top of the next page, as in FIG. 3B(c). The computing device 302 may, in some instances, show an animation of the imaged document 300 advancing from page 1 in FIG. 3B(a) to page 2 in FIG. 3B(c). For instance, the computing device 302 may first zoom out to display all of page 1 (and, in some instances, at least part of previous or next pages) and then zoom in to display the top right corner of page 2. In some embodiments, the computing device 302 zooms out of the display of page 1 but does not zoom in on page 2, instead displaying a zoomed out version of all of page 2. In other embodiments, the computing device 302 does not zoom out of the display of page 1 (as in FIG. 3B(a)) and animates to scroll down to the top of page 2 (as in FIG. 3B(c)).

The reader application may further display features of a physical book or magazine that a user would recognize if he were reading the physical book or document in person. Such displayed features may include the pages that are "under" the displayed pages when a book or magazine lies flat on a table. These features, known on the device as the chrome, may be displayed along the edges of the imaged document as the edges of a plurality of layered pages. In some embodiments, the chrome may be capable of animating, to represent the turning of a page.

At 518, the computing device tracks the zoom level and location on document pages. A user reading a document in the reader application may select to zoom in or out of the imaged document. While the user zooms in and out of the document, the reader application keeps track of the level at which the user zooms. The reader application further keeps track of which page or pages are being displayed on the computing device at any given time. The reader may further keep track of the location on the document where a user is zoomed in, such as, the top right corner or bottom left corner.

At 520, the computing device receives the beginning of a user input determined to indicate an intent to turn a page. In some embodiments, the user input that indicates an intent to turn a page starts with the user touching the display of the computing device and starting to drag his finger on the display. If the user intends to turn to the next page, the user input may be a left swipe, which consists of the user touching the display screen and dragging his finger from right to left. If the user intends to turn to the previous screen, the user input may be a right screen, which consists of the user touching the display screen and dragging his finger from left to right. In some embodiments, where the document is scrolled up and down and the user reads it, an up swipe (touching the display screen and dragging from bottom to top) or down swipe (touching the display screen and dragging from bottom to top) may be used to advance the page or go back in the document.

In response to receiving the beginning of the user input determined to indicate an intent to turn the page at 520, the device then temporarily zooms out of the page currently being displayed at 522. At 524, the device determines whether the user input to turn the page was completed. In some embodiments, the device makes a determination based on the whether the input received at 520 was fully completed. For example, a user may touch the screen and begin to slowly drag his finger on the screen to the left. If the user does not, however, continue this dragging motion to the left and quickly release, the device may determine that the user did not intent to perform a left swipe and turn the page, or, after starting to turn the page, changed his mind. The device may use various parameters to determine whether the user completed the page turn input. For example, the duration of the input or swipe may be analyzed. In other instances, the length of the swipe must be a threshold length in order to complete the page turning motion. In other instances, the device determines that the user flicked the screen to determine that the user input to turn the page was complete. In some embodiments, if the device determines that the user input to turn the page was complete, the device may show an animation of a page being turned. In such an embodiment, the chrome around the edges of the imaged document may animate, showing a page lifting up, turning, and then lying flat.

At 526, the device displays the next or previous page at the zoom level from the prior page. The determination of whether the next page is shown or the previous page is shown depends on the user input. For instance, a left swipe or an up swipe may result in the next page being shown, while a right swipe or a down swipe may result in the previous page being shown. In some embodiments, the device further uses the previously-tracked zoom level of the previous page to determine the zoom level at which to display the next page. In some embodiments, the next page is not zoomed in, regardless of the zoom level of the previous page.

The device may also use the previously-tracked location of the previous page to determine where on the next page to zoom in. For example, if the previous page was zoomed in on the bottom of the page, the next page may be shown as zoomed in at the top of the page, as the device determines that the user has completed reading the previous page and most likely would prefer to start at the top of the following page. In another embodiment, the device uses the same page location on the previous page to display the corresponding location on the next page.

At 528 is shown a result if the user does not complete the motion for a page turn, such as if the user chose to abort a page turn after starting it. For example, a user can begin swiping to turn the page, but before they swipe for a distance that the system will use to determine that the swipe is complete, they may backtrack toward the side of the display where they started, and then lift their finger. In response to such a motion, the page will be animated to drop back to its initial position from before the user started to turn the page.

In sum, logic for performing a page turn may proceed as follows when the user begins swiping:

If the viewport is currently at the bottom-right and the user is left-swiping (moving a finger from right to left), the process begins a page turn to the next page.
Animate to zoomed out.
If the user continues left-swiping and raises the finger, thus committing the motion:
Run the page turn animation, to complete the page turn to the next page.
Zoom in on the upper-left of the book, at a new position but at the previous zoom level.
On the other hand, if the user signals an intent to cancel this swipe by right-swiping and then raising a finger:
Drop the page back to where the user had been. Do NOT advance the page forward.
Zoom in at position and zoom level that the user had been at prior to the original swipe.
If the viewport is at the top-left and the user is right-swiping (moving a finger from left to right), begin a page turn to the previous page.
Animate to zoomed out.
If the user continues right-swiping and raises the finger, thus committing the motion:
Run the page turn animation, to complete the page turn to the previous page.
Zoom in on the lower-right side of the book, at a new position but at the previous zoom level.
On the other hand, if the user signals an intent to cancel this swipe by left-swiping and then raising a finger:
Drop the page back to where the user had been. Do NOT advance the page backward.
Zoom in at the position and zoom level that the user had been at prior to the original swipe.

Figure 6:
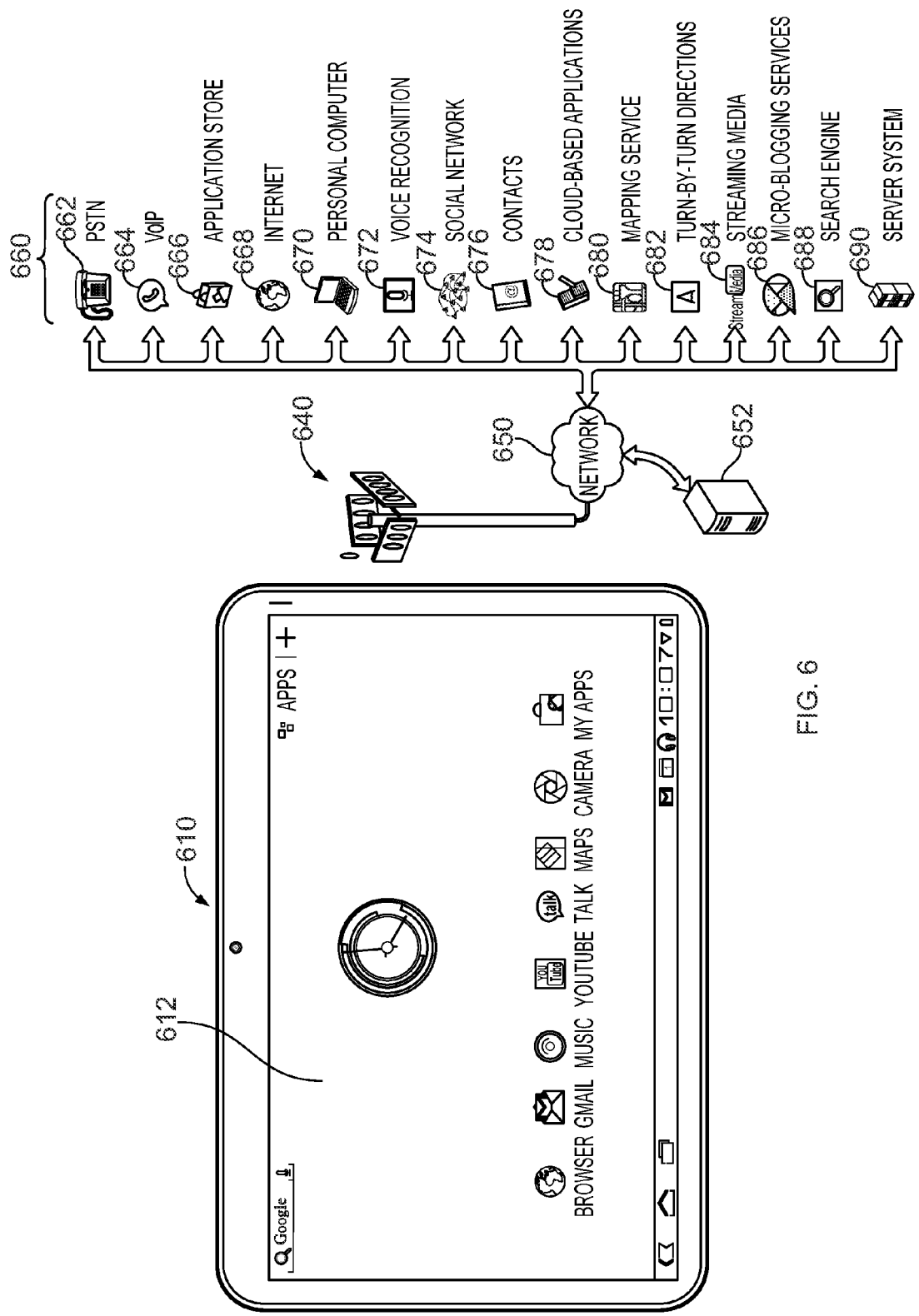
FIGS. 6 and 7 show examples computer devices that can be used to implement the techniques described here.

Referring now to FIG. 6, a conceptual diagram of a system that may be used to implement the systems and methods described in this document is illustrated. In the system, a computing device 610 can wirelessly communicate with base station 640, which can provide the mobile computing device with wireless access to numerous hosted services 660 through a network 650.

In this illustration, the mobile computing device 610 is depicted as a tablet device that includes a touchscreen display 612 for presenting content to a user of the mobile computing device 610 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard, physical buttons, trackballs, accelerometers, gyroscopes, and magnetometers).

Example visual output mechanism in the form of display device 612 may take the form of an LED or AMOLED display with resistive or capacitive touch capabilities, for displaying video, graphics, images, and text, and coordinating user touch inputs locationally with the displayed information so that user contact above a displayed item may be associated with the item by the device 610. The mobile computing device 610 may take alternative forms also, including as a laptop computer, a mobile telephone, a slate computer, a personal digital assistant, an embedded system (e.g., a car navigation system), a desktop personal computer, or a computerized workstation.

An example mechanism for receiving user-input includes a "virtual" keyboard displayed on the touchscreen display 612 or a physical keyboard (not shown), which may be a full qwerty keyboard or a traditional keypad that includes keys for the digits '0-9', '*', and '#.' The keyboard receives input when a user physically contacts or depresses a keyboard key. User manipulation of a trackball or interaction with a trackpad enables the user to supply directional and rate of rotation information to the device 610 (e.g., to manipulate a position of a cursor on the display device 612).

The device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive physical buttons (not shown). Additionally, the mobile computing device may include buttons for adjusting volume output by the one or more speakers (not shown), and a button for turning the mobile computing device on or off. A microphone allows the device 610 to convert audible sounds into an electrical signal that may be digitally encoded and stored in computer-readable memory, or transmitted to another computing device. The device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard. User-selection of the button may invoke the pre-defined action.

In some examples, the operating system provides a "desktop" user interface that is displayed upon turning on the computing device 610, activating the device 610 from a sleep mode, upon "unlocking" the mobile computing device 610, or upon receiving user-selection of a physical button on the computing device 610. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 812 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The computing device 610 may include other application modules and hardware. Where the computing device 610 is a mobile telephone, a call handling unit may receive an indication of an incoming telephone call and provide a user capabilities to answer the incoming telephone call. A media player may allow a user to listen to music or play movies that are stored in local memory of the computing device 610. The device 610 may include a digital camera sensor, and corresponding image and video capture and editing software. An internet browser may enable the user to view content from a web page by typing in an addresses corresponding to the web page or selecting a link to the web page.

The computing device 610 may include an antenna to wirelessly communicate information with the base station 640. The base station 640 may be one of many base stations in a collection of base stations (e.g., a mobile telephone cellular network) that enables the computing device 610 to maintain communication with a network 650 as the computing device 610 is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 560. Although the services 660 may be provided over different networks (e.g., the service provider's internal network, the Public Switched Telephone Network, and the Internet), network 650 is illustrated as a single network. The service provider may operate a server system 652 that routes information packets and voice data between the computing device 610 and computing devices associated with the services 660.

The network 650 may connect the computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the computing device 610. Conversely, the computing device 610 may send a communication to the service provider server system 652 initiating a telephone call with a telephone number that is associated with a device accessible through the PSTN 662.

The network 650 may connect the computing device 610 with a Voice over Internet Protocol (VoIP) service 664 that routes voice communications over an IP network, as opposed to the PSTN. For example, a user of the computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the computing device 610 the ability to browse a list of remotely stored application programs that the user may download over the network 650 and install on the computing device 610. The application store 666 may serve as a repository of applications developed by third-party application developers. An application program that is installed on the computing device 610 may be able to communicate over the network 650 with server systems that are designated for the application program. For example, a VoIP application program may be downloaded from the Application Store 666, enabling the user to communicate with the VoIP service 664.

The computing device 610 may access content on the internet 668 through network 650. For example, a user of the computing device 610 may invoke a web browser application that requests data from remote computing devices that are accessible at designated universal resource locations. In various examples, some of the services 660 are accessible over the internet.

The computing device 610 may communicate with a personal computer 670. For example, the personal computer 670 may be the home computer for a user of the computing device 610. Thus, the user may be able to stream media from his personal computer 670. The user may also view the file structure of his personal computer 670, and transmit selected documents between the computerized devices.

A voice recognition service 672 may receive voice communication data recorded with the computing device's microphone (not shown), and translate the voice communication into corresponding textual data. In some examples, the translated text is provided to a search engine as a web query, and responsive search engine search results are transmitted to the computing device 610.

The computing device 610 may communicate with a social network 674. The social network may include numerous members, some of which have agreed to be related as acquaintances. Application programs on the computing device 610 may access the social network 674 to retrieve information based on the acquaintances of the user of the mobile computing device. For example, an "address book" application program may retrieve telephone numbers for the user's acquaintances. In various examples, content may be delivered to the computing device 610 based on social network distances from the user to other members. For example, advertisement and news article content may be selected for the user based on a level of interaction with such content by members that are "close" to the user (e.g., members that are "friends" or "friends of friends").

The computing device 610 may access a personal set of contacts 676 through network 560. Each contact may identify an individual and include information about that individual (e.g., a phone number, an email address, and a birthday). Because the set of contacts is hosted remotely to the computing device 610, the user may access and maintain the contacts 676 across several devices as a common set of contacts.

The computing device 610 may access cloud-based application programs 678. Cloud-computing provides application programs (e.g., a word processor or an email program) that are hosted remotely from the computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the computing device 610 with street maps, route planning information, and satellite images. An example mapping service is GOOGLE MAPS. The mapping service 680 may also receive queries and return location-specific results. For example, the computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the computing device 610. For example, computing device 610 may request a stream for a pre-recorded video file, a live television program, or a live radio program. Example services that provide streaming media include YOUTUBE and PANDORA.

A micro-blogging service 686 may receive from the computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
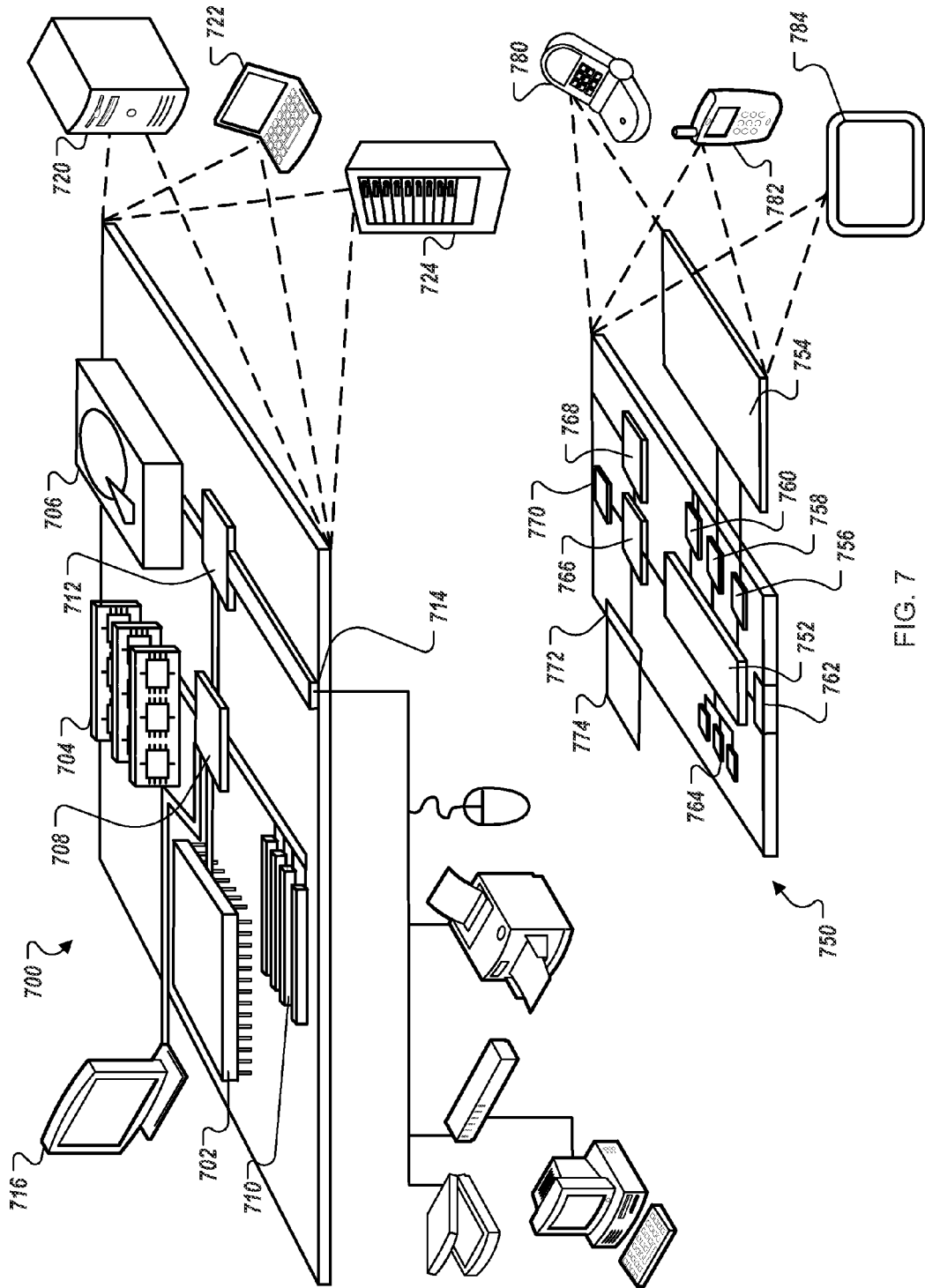

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as tablet devices, personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. The device may be provided with a subscriber identity module (SIM) card that stores a key for identifying a subscriber with a telecommunications carrier to enable communication through the carrier. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, tablet device 784, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for displaying shadowing effects, the method comprising:
   displaying, on a computing device, a first visual object that has a first edge and a second edge that is different from the first edge;
   generating, on a second visual object, a shadow for the first visual object using a shadowing technique along the first edge;
   generating, along the second edge, shading for the first visual object using a shading technique that differs from the shadowing technique;
   receiving user input to move the first visual object on a display of the computing device;
   moving the first visual object on the display, in response to the received user input, so as to reveal at least a portion of the second visual object that is illustrated as being visually below the first visual object on the display; and
   updating the shadow and the shading as the first visual object is in motion on the display, such that at least a portion of the shadow overlays at least a portion of the second visual object as the first visual object is in motion on the display.

2. The method of claim 1, wherein the second edge is on a side of the first visual object opposite the first edge.

3. The method of claim 1, wherein the first visual object is a visual representation of a piece of paper, and the shadow and shading correspond, respectively, to a free edge of the piece of paper, and an attached edge of the paper.

4. The method of claim 3, wherein the first visual object includes page content, the method further comprising:
   as the first visual object is in motion on the display, rendering the first visual object using perspective projection such that a first portion of the first visual object is rendered as being visually further away from a viewer than a second portion of the first visual object by displaying page content located at the first portion of the first visual object as being smaller or closer together.

5. The method of claim 1, wherein the shading technique comprises standard lighting techniques.

6. The method of claim 5, wherein the standard lighting techniques comprise Phong or Blinn shading.

7. The method of claim 5, wherein the standard lighting techniques comprise computing, for particular pixels of the first visual object, a dot product of a normal for the pixel at a particular position with a straight-up vector normal to a plane of a screen on the computing device.

8. The method of claim 5, wherein the standard lighting techniques comprise computing, for particular pixels of the first visual object, a dot product that includes a vector in a direction of a synthetic light source directed at the first visual object.

9. The method of claim 1, wherein the shadow is a shadow cast by the second visual object and the shading is a shading on the first visual object.

10. The method of claim 9, wherein the shading is formed by a visual representation of a bending of the first visual object.

11. The method of claim 1, wherein the shadow and shading visually define, on the computing device, respective edges of the first visual object.

12. The method of claim 1, wherein the shadow and shading provide visual depth cueing of the first visual object to a viewer of the computing device.

13. The method of claim 1, wherein the second visual object includes page content and at least a portion of the shadow overlays at least a portion of the page content as the first visual object is in motion on the display.

14. An article comprising a computer-readable data storage medium storing program code operable to cause one or more machines to perform operations, the operations comprising:
   displaying, on a computing device, a first visual object that has a first edge and a second edge that is different from the first edge;
   generating, on a second visual object, a shadow for the first visual object using a first shadowing technique along the first edge;
   generating, along the second edge, shading for the first visual object using a shading technique that differs from the first shadowing technique;
   receiving user input to move the first visual object on a display of the computing device;
   moving the first visual object on the display, in response to the received user input, so as to reveal at least a portion of the second visual object that is illustrated as being visually below the first visual object on the display; and
   updating the shadow and the shading as the first visual object is in motion on the display, such that at least a portion of the shadow overlays at least a portion of the second visual object as the first visual object is in motion on the display.

15. The article of claim 14, wherein the first visual object is a visual representation of a piece of paper, and the shadow and shading correspond, respectively, to a free edge of the piece of paper, and an attached edge of the paper.

16. The article of claim 15, wherein the first visual object includes page content, the operations further comprising:
   as the first visual object is in motion on the display, rendering the first visual object using perspective projection such that a first portion of the first visual object is rendered as being visually further away from a viewer than a second portion of the first visual object by displaying page content located at the first portion of the first visual object as being smaller or closer together.

17. The article of claim 14, wherein the shadow and shading visually define, on the computing device, respective edges of the first visual object.

18. The article of claim 14, wherein the second visual object includes page content and at least a portion of the shadow overlays at least a portion of the page content as the first visual object is in motion on the display.

19. A system comprising:
   a computing device having a display for displaying graphical images; and
   one or more input devices in communication with the computing device, for receiving user input;
   wherein the computing device further comprises:
      an imager module configured to display, on the display of the computing device, a first visual object that has a first edge and a second edge that is different from the first edge; generate, on a second visual object, a shadow for the first visual object using a shadowing technique along the first edge; generate along the second edge shading for the first visual object using a shading technique that differs from the shadowing technique; and update the shadow as the first visual object moves across the display in response to input provided by a user of the computing device, such that at least a portion of the shadow overlays at least a portion of the second visual object that is illustrated as being visually below the first visual object on the display as the first visual object moves across the display;

an input controller module configured to receive user input relating to the display of the first visual object, using one of the one or more input devices; and a book interaction module configured to receive information from the input controller relating to user input and communicate the received information to the imager module for display of the first visual object, on the display of the computing device.

20. The system of claim 19, wherein the second visual object includes page content and at least a portion of the shadow overlays at least a portion of the page content as the first visual object moves across the display.

* * * * *